US011535266B2

(12) United States Patent
Petre et al.

(10) Patent No.: US 11,535,266 B2
(45) Date of Patent: Dec. 27, 2022

(54) ELECTROMECHANICAL CONTROLLER FOR VEHICLES HAVING A MAIN PROCESSING MODULE AND A SAFETY PROCESSING MODULE

(71) Applicant: Danfoss Power Solutions II Technology A/S, Nordborg (DE)

(72) Inventors: Yolanda Petre, Edina, MN (US); Peter Maria Lauer, Eden Prairie, MN (US)

(73) Assignee: Danfoss Power Solutions II Technology A/S, Nordborg (DK)

( * ) Notice: Subject to any disclaimer, the term of this patent is extended or adjusted under 35 U.S.C. 154(b) by 38 days.

(21) Appl. No.: 16/630,697

(22) PCT Filed: Jul. 12, 2018

(86) PCT No.: PCT/US2018/041870
§ 371 (c)(1),
(2) Date: Jan. 13, 2020

(87) PCT Pub. No.: WO2019/014475
PCT Pub. Date: Jan. 17, 2019

(65) Prior Publication Data
US 2021/0086783 A1  Mar. 25, 2021

Related U.S. Application Data

(60) Provisional application No. 62/532,283, filed on Jul. 13, 2017.

(51) Int. Cl.
*B60W 50/035* (2012.01)
*G05B 19/042* (2006.01)

(52) U.S. Cl.
CPC ....... *B60W 50/035* (2013.01); *G05B 19/0428* (2013.01); *G05B 2219/24024* (2013.01)

(58) Field of Classification Search
CPC ..... G05B 19/0428; G05B 2219/24024; B60W 50/02; B60W 50/035
See application file for complete search history.

(56) References Cited

U.S. PATENT DOCUMENTS

| | | | |
|---|---|---|---|
| 5,508,689 A * | 4/1996 | Rado | B60R 16/0315 340/3.1 |
| 6,711,698 B1 | 3/2004 | Marbach et al. | |

(Continued)

FOREIGN PATENT DOCUMENTS

| | | |
|---|---|---|
| DE | 19735015 A1 | 2/1999 |
| DE | 102008004205 A1 | 7/2009 |

(Continued)

OTHER PUBLICATIONS

Koda, Vehicle Control System, 2004, google patents, 1-7 (Year: 2004).*

(Continued)

*Primary Examiner* — Rocio Del Mar Perez-Velez
*Assistant Examiner* — Yvonne Trang Follansbee
(74) *Attorney, Agent, or Firm* — Merchant & Gould P.C.

(57) ABSTRACT

A driving system for a vehicle includes one or more sensors, a controller, an actuator, and a safety shut down switch. The controller includes a main processing circuit, a main processing module, an actuator drive, a safety processing circuit, a safety processing module, and a safety shutdown switch. The safety processing module is independent of the main processing module, and the safety processing module is configured to perform one or more safety functions.

10 Claims, 2 Drawing Sheets

(56) References Cited

U.S. PATENT DOCUMENTS

| | | |
|---|---|---|
| 7,027,880 B2 | 4/2006 | Izzo et al. |
| 7,213,168 B2 | 5/2007 | Kalan et al. |
| 7,286,885 B2 | 10/2007 | Niwa |
| 7,610,119 B2 | 10/2009 | Abe et al. |
| 7,783,902 B2 | 8/2010 | Nakamura et al. |
| 8,457,766 B2 | 6/2013 | Taira et al. |
| 8,595,827 B2 | 11/2013 | Zondler et al. |
| 8,880,201 B2 | 11/2014 | Taira et al. |
| 9,475,521 B1* | 10/2016 | Fung .................... B62D 15/025 |
| 2003/0058602 A1 | 3/2003 | Veil |
| 2003/0098197 A1 | 5/2003 | Laurent |
| 2004/0128042 A1 | 7/2004 | Takahashi et al. |
| 2005/0203645 A1 | 9/2005 | Klopfer et al. |
| 2006/0126256 A1* | 6/2006 | Forest ................. B60W 50/045 361/139 |
| 2007/0277023 A1* | 11/2007 | Weiberle ............. G06F 9/30181 712/229 |
| 2011/0098830 A1 | 4/2011 | Weddingfeld et al. |
| 2011/0134573 A1 | 6/2011 | Haller |
| 2012/0136540 A1 | 5/2012 | Miller |
| 2012/0191226 A1 | 7/2012 | Nordberg et al. |
| 2014/0200687 A1 | 7/2014 | Stegmaier et al. |
| 2014/0313622 A1 | 10/2014 | Taira et al. |
| 2015/0100207 A1* | 4/2015 | Yoshimura .......... B60L 15/2009 701/41 |
| 2018/0370540 A1* | 12/2018 | Yousuf ................ B60W 50/023 |

FOREIGN PATENT DOCUMENTS

| | | |
|---|---|---|
| DE | 20 2011 109 158 U1 | 1/2012 |
| DE | 102011084534 A1 | 4/2012 |
| EP | 1 517 203 A2 | 3/2005 |
| EP | 0 977 100 B1 | 10/2007 |
| EP | 1 770 460 B1 | 6/2012 |
| EP | 2 680 094 A1 | 1/2014 |
| JP | JR-2005291173 A * | 10/2005 |

OTHER PUBLICATIONS

International Search Report and Written Opinion of the International Searching Authority for International Patent Application No. PCT/US2018/041870 dated Jan. 2, 2019, 12 pages.

SFX 2000 Controller, Programmed with Eaton Control F(x)™ to IEC 61131-3 Standard, Eaton Corporation, 3 pages (2008).

Supplementary Partial European Search Report for European Patent Application No. EP 18 83 2834 dated May 21, 2021, 8 pages.

* cited by examiner

ELECTROMECHANICAL CONTROLLER FOR VEHICLES HAVING A MAIN PROCESSING MODULE AND A SAFETY PROCESSING MODULE

CROSS-REFERENCE TO RELATED APPLICATION

This application is a National Stage Application of PCT/US2018/041870, filed on Jul. 12, 2018, which claims the benefit of U.S. Patent Application Ser. No. 62/532,283, filed on Jul. 13, 2017, the disclosures of which i-s are incorporated herein by reference in their entireties. To the extent appropriate, a claim of priority is made to each of the above disclosed applications.

BACKGROUND

Drive-by-wire systems such as steer-by-wire, throttle-by-wire, and brake-by-wire perform vehicle functions traditionally performed by mechanical linkages. These systems run on complex software that is executed by an electromechanical controller which processes inputs received from various sensors for producing an output performed by an electromechanical actuator. In order to test and validate drive-by-wire systems to ensure that they will execute properly when implemented in a vehicle, rigorous testing of the software is performed on the controller. Therefore, improvements are needed.

SUMMARY

The present disclosure relates generally to an electromechanical system and controller.

In one aspect, the disclosed technology relates to a controller for a vehicle, the controller comprising a main processing module and a safety processing module, each configured to process one or more command inputs and to generate one or more command outputs; wherein the safety processing module is independent of the main processing module, and is configured to perform one or more safety functions; wherein the one or more safety functions comprise generating an expected command output value based on the one or more command inputs, and comparing the expected command output value with an actual command output value generated by the main processing module. The one or more safety functions may further comprise generating a safety control signal if a difference between the expected command output value and the actual command output value is greater than a defined tolerance. In one example, the safety control signal activates a safety shutdown switch that returns a electromechanical actuator to a fail-safe state and the fail-safe state disables one or more functions of the vehicle. In one embodiment, the controller includes a main processing circuit and a safety processing circuit, wherein the safety processing circuit is independent of the main processing circuit, and is configured to convert sensor data for compatibility with one or more processors in the safety processing module. In another embodiment, the safety processing module comprises a processor and memory, and wherein the processor and memory of the safety processing module are separate from a processor and memory in the main processing module.

In another aspect, the disclosed technology relates to a driving system for a vehicle, the system comprising: one or more sensors configured to collect one or more command inputs; a controller comprising a main processing module and a safety processing module, one or more electromechanical actuators configured to receive an actual command output value generated by the main processing module; and a safety shutdown switch configured to receive a control signal generated by the safety processing module. The safety processing module is independent of the main processing module, and the safety processing module is configured to perform one or more safety functions. The one or more safety functions comprise generating an expected command output value based on the one or more command inputs, and comparing the expected command output value with the actual command output value generated by the main processing module. The one or more safety functions may include generating the safety control signal if a difference between the expected output value and the actual output value is greater than a defined tolerance. The safety control signal activates the safety shutdown switch to return the one or more electromechanical actuator to a fail-safe state and the fail-safe state disables one or more functions of a vehicle. In one embodiment, the safety processing module comprises one or more processors and memories separate from one or more processors and memories in the main processing module.

In another aspect, the disclosed technology relates to a method for controlling a vehicle, the method comprising: collecting input commands; generating an actual command output value by a main processing module for changing a driving condition of a vehicle; generating an expected command output value by a safety processing module for determining whether the vehicle is operating properly; comparing the actual command output value with the expected command output value; and returning an electromechanical actuator to a fail-safe state if the actual command output value is outside a predefined range of the expected command output value. The fail-safe state may disable one or more driving functions of a vehicle. In one example, the method includes storing algorithms and expected performance data in a memory of the safety processing module. In one embodiment, the method includes retrieving the expected command output value from an actuator drive. In one example, there is no direct communication between the safety processing module an the main processing module.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
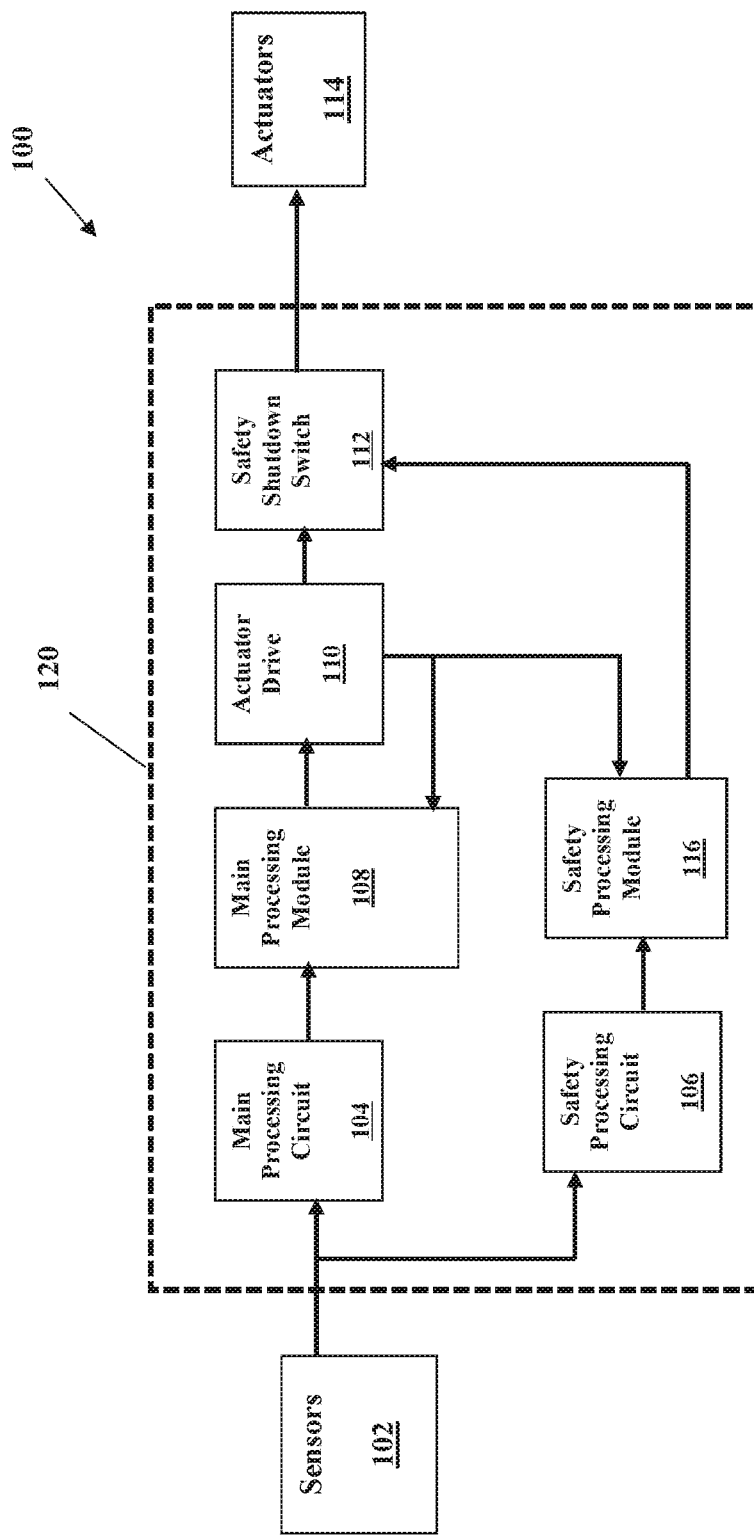
FIG. 1 is a diagram of an exemplary electromechanical system.

FIG. 1 shows an electromechanical system 100. The electromechanical system 100 has one or more sensors 102, a controller 120, and one or more electromechanical actuators 114.

The one or more sensors 102 detect input commands by detecting the displacement of one or more levers in a vehicle. For example, the sensors 102 may detect an angle of a steering wheel (e.g., in the case of a steering-by-wire system) or a distance that a pedal has been pushed (e.g., in the case of brake-by-wire and throttle-by-wire systems). It is contemplated that the sensors 102 can detect other types of displacements from different types of levers such as the vertical and horizontal displacement of a joystick. In one example, the sensors 102 are position sensors; however, it is contemplated that other types of sensors such as pressure sensors can be used to detect an input command from the driver of the vehicle.

The controller 120 is a processor circuit enclosed in a housing. The controller 120 includes a main processing circuit 104, a main processing module 108, and an actuator drive 110. The controller 120 further includes a safety processing circuit 106, a safety processing module 116, and a safety shutdown switch 112.

The input commands detected by the sensors 102 are received by both the main processing circuit 104 and the safety processing circuit 106 in the controller 120. The main processing circuit 104 converts the sensor data for compatibility with one or more processors in the main processing module 108. Similarly, the safety processing circuit 106 converts the sensor data for compatibility with one or more processors in the safety processing module 116. In the controller 120, the main processing circuit 104 is separate and independent from the safety processing circuit 106.

The main processing module 108 and the safety processing module 116 in the controller 120 each comprise one or more processors and memories. In one example embodiment, the processors in the main processing module 108 and the safety processing module 116 may be 32 bit 200 MHz processors. In another example embodiment, the memories of the main processing module 108 and the safety processing module 116 may include RAM, flash memories, and electrically erasable programmable read-only memories (EEPROMs). The main processing module 108 and the safety processing module 116 each process the input commands detected by the sensors 102. In the controller 120, the main processing module 108 is separate and independent from the safety processing module 116. Moreover, there is no direct communication between the main processing module 108 and the safety processing module 116.

The actuator drive 110 in the controller 120 is an electronic circuit that receives output command values from the main processing module 108 and converts the output command values for compatibility with the one or more electromechanical actuators 114.

The one or more electromechanical actuators 114 receive the output command values from the controller 120 to change the driving condition of a vehicle (e.g., increase or decrease speed, turn left or right, etc.) In some examples, the one or more electromechanical actuators 114 are electrohydraulic actuators such as an electrohydraulic piston driven by a valve. In other examples, the electromechanical actuators 114 can be any type of electromechanical actuator.

In operation, the main processing module 108 generates an actual command output value based on an input command received via the main processing circuit 104. In the case of a driver pushing the brake pedal of a vehicle, an input command is detected by a sensor 102 and is received in the main processing module 108 via the main processing circuit 104. The main processing module 108 then generates the actual command output value. In one example, the main processing module 108 may use proportional intake differential (PID) algorithms for generating the actual command output value. The actual command output value is processed by the actuator drive 110 for controlling one or more electromechanical actuators 114 that activate the brakes of the vehicle. Accordingly, the speed of the vehicle can be reduced by the electromechanical system 100 without using the traditional mechanical linkages between the brake pedal and the brakes of the vehicle.

Various safety routines are performed to ensure that the electromechanical system 100 is operating properly. For example, algorithms and expected performance data can be stored in the memory of the safety processing module 116. The safety processing module 116 generates an expected command output value based on an input command received via the safety processing circuit 106. The safety processing module 116 may comprise a lockstep system having multiple processors that run parallel operations at the same time. Accordingly, the redundancy in the safety processing module 116 allows error detection and error correction of the expected command output value. The safety processing module 116 retrieves from the actuator drive 110 the actual command output value generated by the main processing module 108, and compares the expected command output value with the actual command output value. A difference between the actual command output value and the expected command output value that is within a defined tolerance stored in the memory of the safety processing module 116 is acceptable, and the controller 120 can continue to operate under normal operating conditions. However, if the actual command output value differs from the expected command output value by a margin greater than the defined tolerance stored in the memory of the safety processing module 116, the safety processing module 116 generates a safety control signal that activates the safety shutdown switch 112. When activated, the safety shutdown switch 112 disables the one or more electromechanical actuators 114. In the case of an electrohydraulic actuator, an electrohydraulic valve can return a piston to a predefined safe/neutral position (i.e., a fail-safe state). Accordingly, some driving functions can be disabled by the controller 120 when the actual performance of the controller differs from an expected performance.

As an example, if the safety processing module 116 receives an input command to decrease the speed of the vehicle, the safety processing module 116 can compute an expected command output value using the algorithms and expected performance data stored in the memory of the safety processing module 116. The safety processing module 116 then retrieves from the actuator drive 110 the actual command output value generated by the main processing module 108, and compares the actual command output value with the expected command output value. If the difference between the actual command output value and the expected command output value is greater than the predefined tolerance, the safety processing module 116 generates a safety control signal that activates the safety shutdown switch 112. Similarly, if the safety processing module 116 is unable to retrieve an actual command output value because no output command value was generated by the main processing module 108, the safety processing module 116 generates a safety control signal that activates the safety shutdown switch 112. When activated, the safety shutdown switch 112 can disable one or more electromechanical actuators 114 coupled to the throttle of the vehicle such that the vehicle is prevented from accelerating forward. In this way, a safety state of the vehicle is ensured if the safety processing module 116 detects that the controller 120 is incorrectly processing input commands for reducing the speed of the vehicle. It is noted that while some functions may be disabled in the safety state, other functions of the vehicle can be maintained. For example, the engine of the vehicle can be kept running and some non-essential functions of the vehicle can be kept running. By separating the safety processing circuit 106 from the main processing circuit 104, and performing the main functions and safety functions on the separate main processing module 108 and the safety processing module 116, respectively, the software of the controller 120 is simplified. For example, when programming the controller 120, the technical standards for the safety functions do not need to be accounted for in the main processing module 108. Moreover, communication between the main functions and safety functions is eliminated in the controller 120 which further simplifies the software of the controller 120. Accordingly, the separate and independent main processing module 108 and safety processing module 116 simplify the software of the drive-by-wire system, and improve the efficiency and speed of the testing and validation of the drive-by-wire system. These hardware components also reduce the time for setting up and programming the controller 120.

At the same time, by having a lockstep system in the safety processing module 116 in which multiple processors run parallel operations at the same time, the error detection and error correction of the controller 120 is maintained. The independence of the safety processing module 116 and the predefined tolerance allowing for small differences between the actual command output value and the expected command output value also improves the quality of monitoring the input and output drive feedback signals in the controller 120. The independence of the safety processing module 116 also brings different operational and failure characteristics, while the command output value difference brings different ALU (Arithmetic Logic Unit) processing which helps to avoid common processing errors. Moreover, performing the main functions and safety functions on the separate main processing module 108 and safety processing module 116, respectively, increases the processing speed of the controller 120 during operation of the vehicle.

Figure 2:
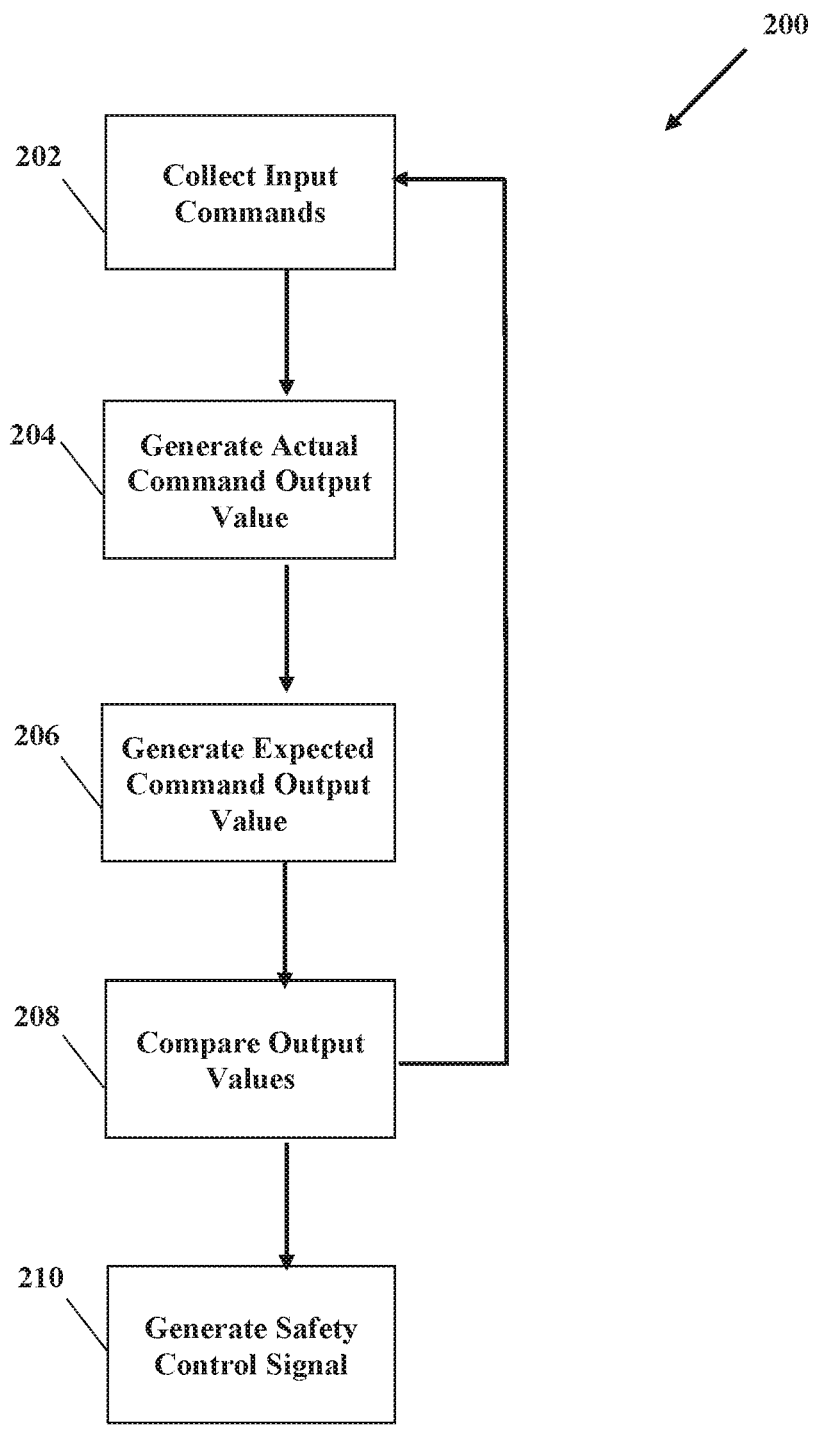
FIG. 2 is a flow diagram of a method for operating an electromechanical system.

FIG. 2 is a flow diagram of a method 200 for operating the electromechanical system 100 for controlling a vehicle. The method 200 comprises a first step 202 of collecting input commands from the one or more sensors 102, a second step 204 of generating an actual command output value by the main processing module 108 for changing a driving condition of the vehicle, and a third step 206 of generating an expected command output value by the safety processing module 116. Next, the method 200 includes the step 208 of comparing the actual command output value with the expected command output value for determining whether the vehicle is operating properly. A difference between the actual command output value and the expected command output value that is within a defined tolerance stored in the memory of the safety processing module 116 is acceptable, and the controller 120 can continue to operate under normal operating conditions. Accordingly, the steps 202-208 may be repeated at will. However, if the actual command output value differs from the expected command output value by a margin greater than the defined tolerance stored in the memory of the safety processing module 116, the safety processing module 116 in a further step 210 generates a safety control signal that activates the safety shutdown switch 112 for disabling one or more electromechanical actuators 114. In the method 200, the safety processing module 116 is a hardware component that is independent of the main processing module 108. The main processing module 108 and the safety processing module 116 each comprise separate processors, memories, and a CPU.

It is contemplated that the controller 120 can be used for any type of vehicle. In some examples, the controller 120 can be used in off-highway vehicles such as forklifts, tractors, harvesters, all-terrain vehicles (ATVs), dune buggies, snowmobiles, etc.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed:

1. A controller for a vehicle, the controller comprising:
a main processing module having one or more processors and at least one memory, the main processing module being configured to process one or more command inputs to generate a command output value for the vehicle;
an actuator drive receiving the command output value from the main processing module and converting the command output value for compatibility with an electromechanical actuator; and
a safety processing module having one or more processors and at least one memory, the safety processing module being configured to process the one or more command inputs to generate an expected command output value;
wherein the safety processing module is independent of the main processing module, and is configured to generate the expected command output value separately and independently of the main processing module;
wherein there is no direct communication between the safety processing module and the main processing module;
wherein the safety processing module compares the expected command output value with the command output value generated by the main processing module by retrieving directly from the actuator drive the command output value generated by the main processing module;
wherein the safety processing module generates a safety control signal when a difference between the expected command output value and the command output value is greater than a predefined tolerance; and
wherein the safety control signal activates a safety shutdown switch that returns the electromechanical actuator to a fail-safe state.

2. The controller of claim 1, wherein the fail-safe state disables one or more functions of the vehicle.

3. The controller of claim 1, further comprising a main processing circuit and a safety processing circuit,
wherein the safety processing circuit is independent of the main processing circuit, and is configured to convert sensor data for compatibility with the one or more processors in the safety processing module.

4. The controller of claim 1, wherein the one or more processors and the at least one memory of the safety processing module are separate from the one or more processors and the at least one memory in the main processing module.

5. A driving system for a vehicle, the driving system comprising:
   one or more sensors configured to collect one or more command inputs;
   a controller comprising:
      a main processing module having one or more processors and at least one memory, the main processing module being configured to process the one or more command inputs to generate a command output value for the vehicle;
      an actuator drive receiving the command output value from the main processing module and converting the command output value for compatibility with one or more electromechanical actuators; and
      a safety processing module having one or more processors and at least one memory, the safety processing module being configured to process the one or more command inputs to generate an expected command output value;
   an actuator of the one or more electromechanical actuators, the actuator configured to change a driving condition of the vehicle based on the command output value converted by the actuator drive; and
   a safety shutdown switch configured to receive a control signal generated by the safety processing module;
   wherein the safety processing module is independent of the main processing module, and the safety processing module is configured to generate the expected command output separately and independently of the main processing module;
   wherein there is no direct communication between the safety processing module and the main processing module;
   wherein the safety processing module compares the expected command output value with the command output value generated by the main processing module by retrieving directly from the actuator drive the command output value generated by the main processing module, and generates the safety control signal when a difference between the expected command output value and the command output value is greater than a predefined tolerance; and
   wherein the safety control signal activates the safety shutdown switch to return the actuator to a fail-safe state.

6. The system of claim 5, wherein the fail-safe state disables one or more functions of the vehicle.

7. The system of claim 5, wherein the one or more processors and at least one memory of the safety processing module are separate from the one or more processors and at least one memory in the main processing module.

8. A method for controlling a vehicle, the method comprising:
   collecting command inputs;
   generating an actual command output value by a main processing module for changing a driving condition of the vehicle;
   converting the actual command output value by an actuator drive for compatibility with an electromechanical actuator;
   generating an expected command output value by a safety processing module for determining whether the vehicle is operating properly, wherein the expected command output value is generated by the safety processing module separately and independently of the actual command output value generated by the main processing module, and wherein there is no direct communication between the safety processing module and the main processing module;
   retrieving directly from the actuator drive the actual command output value;
   comparing the actual command output value with the expected command output value; and
   returning the electromechanical actuator to a fail-safe state when the actual command output value is outside a predefined range of the expected command output value.

9. The method of claim 8, wherein the fail-safe state disables one or more driving functions of a vehicle.

10. The method of claim 8, further comprising storing algorithms and expected performance data in a memory of the safety processing module.

* * * * *